United States Patent
Wu et al.

(10) Patent No.: US 10,207,490 B2
(45) Date of Patent: Feb. 19, 2019

(54) ULTRAFINE FIBER PRINTING SYSTEM

(71) Applicant: National Taiwan University of Science and Technology, Taipei (TW)

(72) Inventors: Chang-Mou Wu, Xiluo Township (TW); I-Ting Chen, Tainan (TW); Jo-Cheng Chiang, Keelung (TW)

(73) Assignee: National Taiwan University of Science and Technology, Taipei (TW)

( * ) Notice: Subject to any disclaimer, the term of this patent is extended or adjusted under 35 U.S.C. 154(b) by 190 days.

(21) Appl. No.: 15/272,470

(22) Filed: Sep. 22, 2016

(65) Prior Publication Data
US 2017/0268130 A1   Sep. 21, 2017

(30) Foreign Application Priority Data

Mar. 18, 2016   (TW) .............................. 105108430 A

(51) Int. Cl.
| | |
|---|---|
| *D01D 5/00* | (2006.01) |
| *B33Y 50/02* | (2015.01) |
| *B33Y 30/00* | (2015.01) |
| *B29C 64/209* | (2017.01) |
| *B29K 105/00* | (2006.01) |

(Continued)

(52) U.S. Cl.
CPC ............ *B33Y 50/02* (2014.12); *B29C 64/209* (2017.08); *B33Y 30/00* (2014.12); *D01D 5/0023* (2013.01); *D01D 5/0069* (2013.01); *B29C 64/106* (2017.08); *B29C 64/112* (2017.08); *B29C 64/236* (2017.08); *B29C 64/241* (2017.08); *B29C 64/25* (2017.08); *B29C 64/364* (2017.08); *B29K 2105/0067* (2013.01); *B33Y 10/00* (2014.12); *D01D 5/0076* (2013.01); *D01D 5/0084* (2013.01); *D01D 5/096* (2013.01); *D01D 5/098* (2013.01)

(58) Field of Classification Search
CPC .. D01D 5/0023; D01D 5/0061; D01D 5/0069; D01D 5/0076; D01D 5/0084; D01D 5/096; D01D 5/098; B29C 64/106; B29C 64/112; B29C 64/209; B29C 64/236; B29C 64/241; B29C 64/225; B29C 64/25; B29C 64/364; B33Y 10/00; B33Y 30/00; B33Y 50/02
USPC ....... 425/72.2, 131.5, 378.2, 382.2, 174.8 E; 264/172.17
See application file for complete search history.

(56) References Cited

U.S. PATENT DOCUMENTS

| | | | | |
|---|---|---|---|---|
| 2010/0112020 A1* | 5/2010 | Westbroek | ........... | D01D 5/0061 424/401 |
| 2010/0330144 A1* | 12/2010 | Liu | ..................... | B05B 13/0442 424/423 |
| 2016/0325480 A1* | 11/2016 | Soletti | .................. | D01D 5/0061 |

* cited by examiner

*Primary Examiner* — Joseph S Del Sole
*Assistant Examiner* — Lawrence D. Hohenbrink, Jr.
(74) *Attorney, Agent, or Firm* — Alan D. Kamrath; Kamrath IP Lawfirm, P.A.

(57) ABSTRACT

An ultrafine fiber printing system contains a moving deck having a nozzle seat that is disposed on the moving deck. A pipe is installed in the nozzle seat, and a nozzle is disposed at the bottom end of the pipe. The upper portion and the lower portion of the pipe are combined with a heat dissipating unit and a heater respectively. The top end of the pipe is connected to a feed tube having an outer end connected with a thread squeezer. A printing platform is disposed around the moving deck. The nozzle is connected to a static electricity supply, and the fiber carrier is grounded. An electric field is formed between the nozzle and the fiber carrier. The droplets exported from the nozzle are stretched into ultrafine fibers to form a patterned fabric or product.

8 Claims, 7 Drawing Sheets

(51) Int. Cl.
*B29C 64/364* (2017.01)
*B33Y 10/00* (2015.01)
*D01D 5/098* (2006.01)
*B29C 64/25* (2017.01)
*B29C 64/241* (2017.01)
*B29C 64/112* (2017.01)
*D01D 5/096* (2006.01)
*B29C 64/236* (2017.01)
*B29C 64/106* (2017.01)

ULTRAFINE FIBER PRINTING SYSTEM

FIELD OF THE INVENTION

The present invention relates to a fiber producing apparatus and, more particularly, to an ultrafine fiber producing apparatus that is capable of producing ultrafine fibers or producing shape customized ultrafine fiber membranes.

BACKGROUND OF THE INVENTION

Conventional plastic fiber printers, such as 3D printers, extrude melted liquid form plastic as plastic wires from an exporting end of a heating tube into a preset shape. The liquid plastic wires are formed by melting plastic filament inside a feed screw heated by the heating tube.

Conventional plastic wire printers are operated with feed screws, which squeeze the melted plastic filament to be ejected from the exporting end located at the bottom of the heating tube. The widths of the plastic wires usually range from 0.5 mm to 1.0 mm, which are not fine enough to form products with nanofibers. Also, the plastic fibers exported from the bottom of the heating tube are not suitable for making fabrics or filters.

Currently, to increase the fineness of plastic wires produced from 3D printers, several improvements have been applied. Those improvements may, for instance, include adjustment of the types of plastic materials, the heating temperature, the pore diameter of the exporting end, and the like to reduce the sizes of the plastic fiber from 3D printers. However, these adjustments are not good enough for producing fabrics or shaped products by nano scale wires.

SUMMARY OF THE INVENTION

To solve the aforementioned problems in 3D printers, an ultrafine fiber printing system of the present invention is provided.

The present invention has a main printing unit, a printing platform, and a static electricity supply. The main printing unit has a moving deck having a nozzle seat to be driven to move along an axis. The nozzle seat is combined with a sprayer set having at least one pipe. A nozzle is connected with an end of each of the at least one pipe, and a thread squeezer is connected with the opposing end of each of the at least one pipe. Each of the at least one pipe is sheathed in a heat dissipating unit and a heater, and the heater is closer to the nozzle than the heat dissipating unit. The printing platform is disposed around the moving deck and has a fiber carrier. The static electricity supply provides voltage. The nozzle and the fiber carrier are respectively connected to the static electricity supply and a ground. Thus, an electric field is formed between the nozzle and the fiber carrier.

According to an embodiment of the present invention, the nozzle seat has an extended portion extended outwardly toward a side of the printing platform, and the sprayer set having the pipe is combined with an outer end of the extended portion. The pipe is in an upright orientation, and the nozzle is connected to the bottom end of the pipe. The thread squeezer is disposed on the nozzle seat, and a feed tube is connected between the thread squeezer and the top end of the pipe. While practicing the present invention, the nozzle seat of the main printing unit may be freely moved for bringing the sprayer set and the nozzle along a predetermined track or area to be printed/ ejected. When an electrical voltage is applied to each nozzle by the static electricity supply, an electric field will be formed between each nozzle and the fiber carrier. The plastic filaments are continuously delivered to the pipe from the thread squeezer. As a result, the plastic filaments continuously delivered to the pipe can be melted into liquid plastic, and the liquid plastic can be exported from each nozzle as droplets.

When these droplets of the liquid plastic enter the electric field, the droplets will be accelerated and drifted toward the fiber carrier, so that the droplets will be stretched to form nano-scale ultrafine fibers during this process. These ultrafine fibers will be attached on the surface of the fiber carrier, thereby forming a fabric membrane composed of ultrafine fibers on the surface of the fiber carrier. The fiber carrier can be a rotatable cylinder, so that the ultrafine fibers can be wound and collected on this cylinder.

The sprayer set of the present invention can be moved relatively to the fiber carrier. By moving the nozzle along different tracks designated by a user, the fiber carrier may be injected on different places to fulfill variable demands of the user. Moreover, by forming the electric field between the nozzles and the fiber carrier, the droplets of the liquid plastic exported from the nozzles can be stretched into nano-scale ultrafine fibers in such electric field. After collection, soft fabric membranes with defined shape or ultrafine fibers can be produced. With using the technology disclosed in the present invention, the shape and thickness of the fabric membranes may be controlled and be programmable, and the membranes products has a lot of different applications such as medical use and special shape filters.

BRIEF DESCRIPTION OF THE DRAWINGS

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
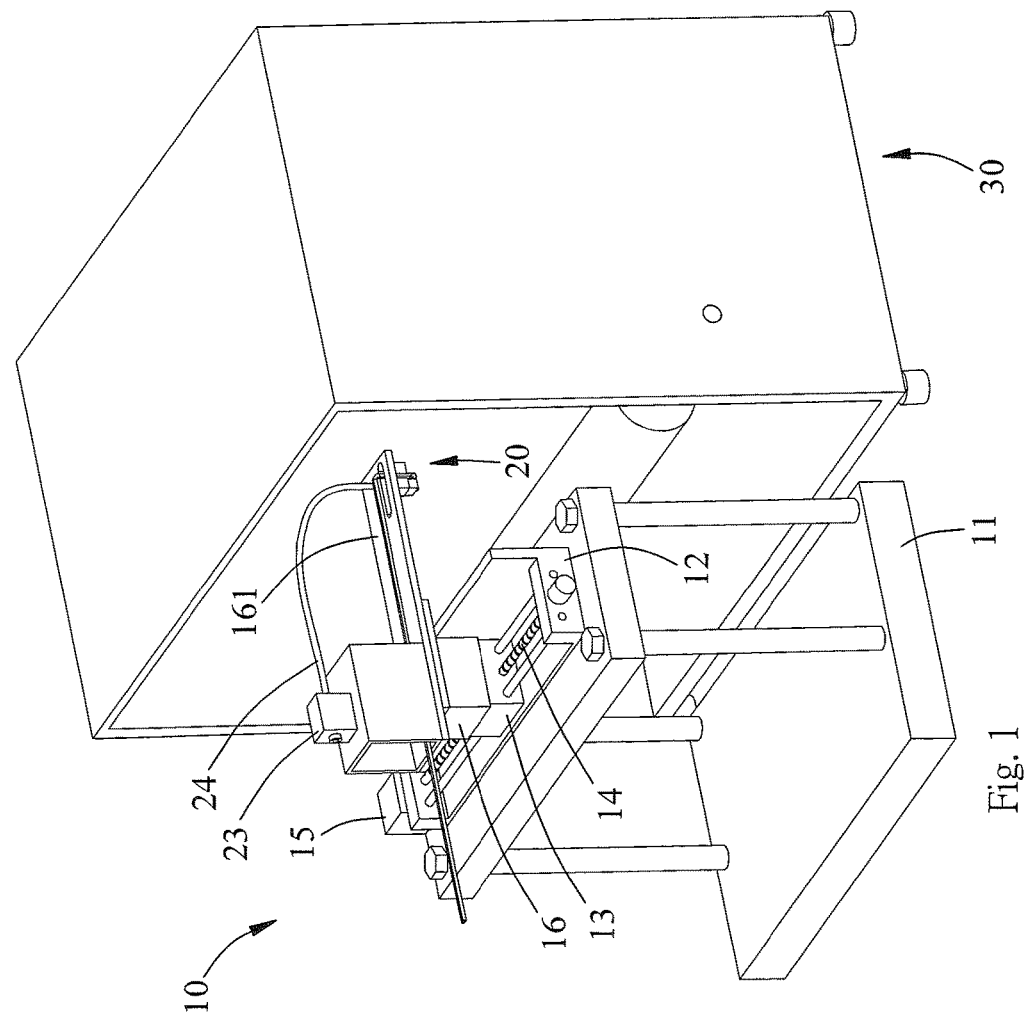
FIG. 1 is a perspective view illustrating a first preferred embodiment of the present invention.
Figure 2:
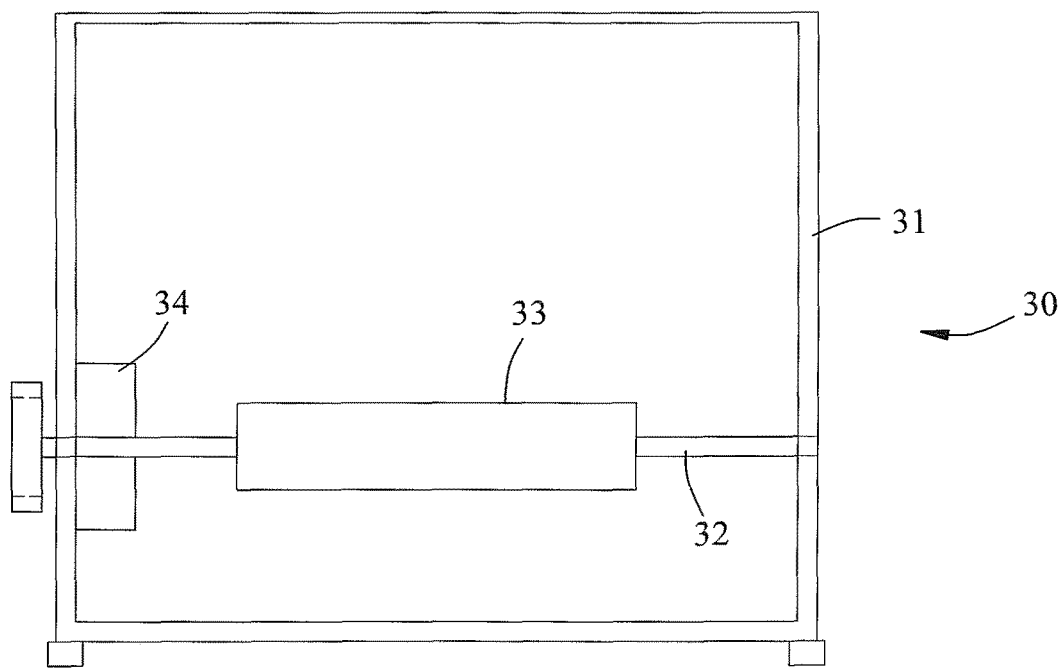
FIG. 2 is a left side view of a printing platform according to the first preferred embodiment of the present invention.
Figure 3:
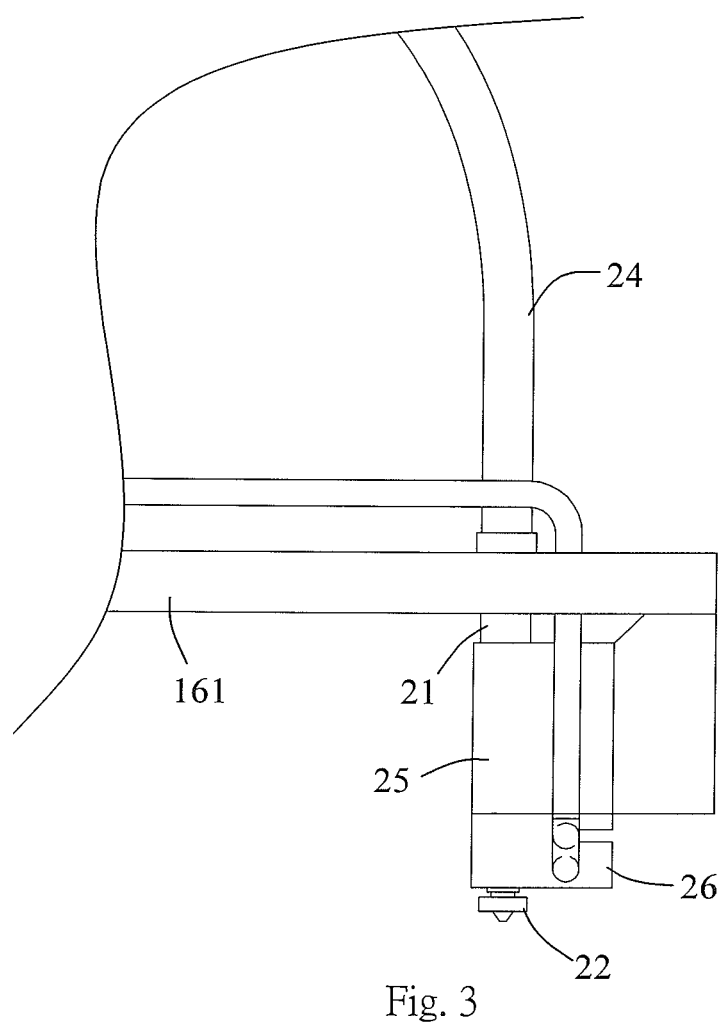
FIG. 3 is a partial front view of an enlarged sprayer set according to the first preferred embodiment of the present invention.
Figure 4:
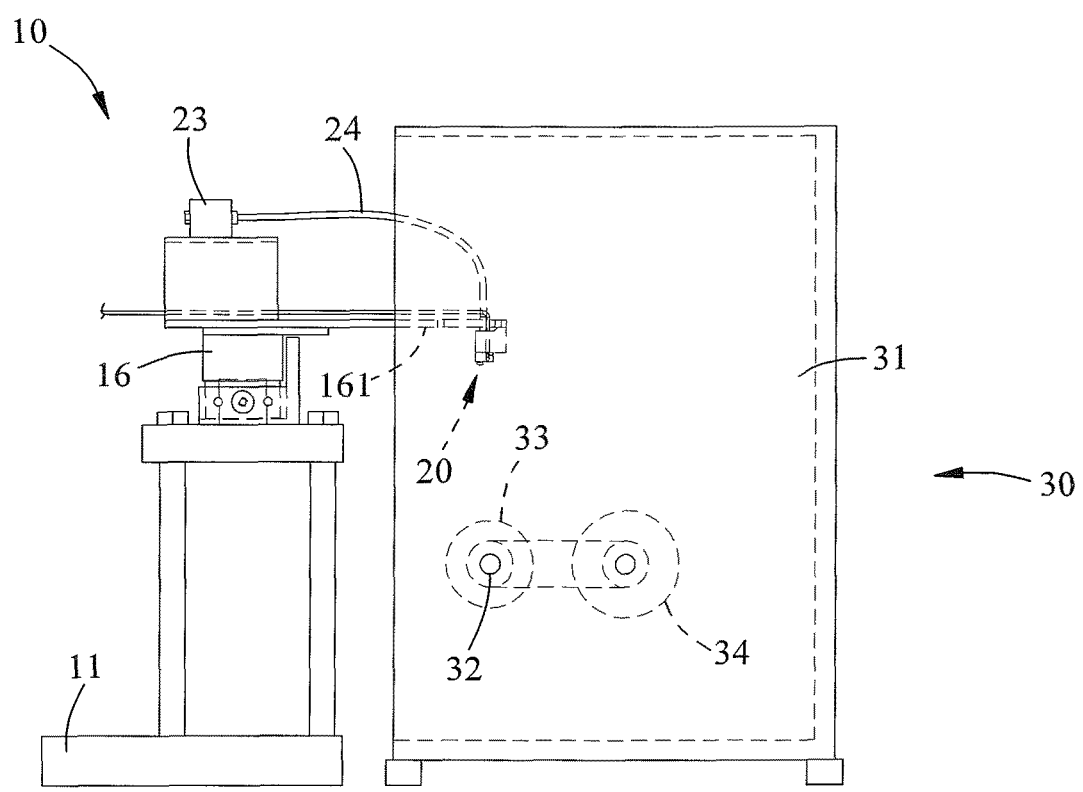
FIG. 4 is a front view of the first preferred embodiment of the present invention.

The structure and technical features of the present invention will be now described in considerable detail with reference to some embodiments and the accompanying drawings, so that the present invention can be easily understood.

With reference to FIG. 1 to FIG. 4, a first embodiment of the ultrafine fiber printing system includes a main printing unit 10, a printing platform 30 disposed around the main printing unit 10, a control circuit 40 connected with the main printing unit 10 and the printing platform 30, a display unit 50 connected to the control circuit 40, and a static electricity supply 60 supplying electricity to the main printing unit 10, the printing platform 30, the control circuit 40, and the display unit 50.

The main printing unit 10 has a moving deck 11 uprightly oriented, and the top of the moving deck 11 is combined with a horizontally oriented track 12. A sliding block 13 is slidably disposed on the track 12, so that the sliding block 13 can be slid along the track 12. A driving screw 14 is rotatably disposed along the middle of the track 12, and, more specifically, the driving screw 14 is parallel to the track 12. A driving servomotor 15 is disposed at an end of the track 12. The driving servomotor 15 is connected to and configured to drive the rotation of the driving screw 14. The driving screw 14 is penetrated through the center of the sliding block 13.

The sliding block 13 is combined with a nozzle seat 16, and the nozzle seat 16 has an extended portion 161 and extends outwardly toward the printing platform 30. A sprayer set 20 having a pipe 21 in an upright orientation is combined with the bottom of an outer end of the extended portion 161. A nozzle 22 is connected to the bottom end of the pipe 21. More particularly, the sprayer set 20 is combined with the bottom of the outer end of the extended portion by installing the top of the nozzle 22 into the outer end of the extended portion 161. A thread squeezer 23 is disposed on the nozzle seat 16, and a feed tube 24 is connected between the thread squeezer 23 and the top end of the pipe 21. The upper portion and the lower portion of the pipe 21 are respectively sheathed in a heat dissipating unit 25 and a heater 26. The heat dissipating unit 25 includes a fan and a heat sink, and the heater 26 is an electric heater.

The printing platform 30 has a box 31 disposed in front of the main printing unit 10. The front end of the extended portion 161 and the sprayer set 20 are extended into the front part of the box 31. A rotation shaft 32 is rotatably disposed inside the box 31, and the rotation shaft 32 is horizontally oriented. The rotation shaft 32 is disposed beneath the sprayer set 20. A fiber carrier 33 is an electrically conductive cylinder concentrically covering and surrounding the rotation shaft 32, where the fiber carrier 33 is grounded. A winding servomotor 34 is disposed in the box 31 and connected to the rotation shaft 32, thereby driving the rotation of the rotation shaft 32 and the fiber carrier 33.

The control circuit 40 is electrically connected to the driving servomotor 15, nozzle 22, the thread squeezer 23, the heat dissipating unit 25, the heater 26 of the main printing unit 10, as well as the winding servomotor 34 of the printing platform 30.

The display unit 50 has a LCD display 51 and a control button set 52. The display unit 50 is connected to the control circuit 40, and information delivered from the control circuit 40 is shown on the LCD display 51. The control button set 52 is operated with the control circuit 40 for exporting control commands.

The static electricity supply 60 is electrically connected to the control circuit 40 and supplies electrical voltage to the main printing unit 10, the printing platform 30, the control circuit 40, and the Display unit 50, and, specifically, the LCD display 51 for normal operation. Additionally, the static electricity supply 60 also supplies electrical voltage to the nozzle 22 for forming the electric field between the nozzle 22 and the fiber carrier 33.

For practicing the first embodiment of the present invention, plastic filament will be inserted into the rear end of the thread squeezer 23. The plastic filament will be continuously delivered from the thread squeezer 23 into the pipe 21. At the same time, the portion of the pipe 21 close to the nozzle 22 will be heated by the heater 26, which is controlled by the control circuit 40. The other portion of the pipe 21 is combined with the heat dissipating unit 25, thereby avoiding overheating. Therefore, the plastic filaments being continuously delivered to the pipe 21 can be melted in a liquid form, and, finally, this liquid plastic can be exported from the nozzle 22 in a form of droplets.

The electric field formed between the nozzle 22 and the printing platform 30 is extremely high to trigger an acceleration of the droplets to drift toward the fiber carrier 33. During the drift, the droplets will be stretched, thereby forming ultrafine fibers in the electric field. Further, because the fiber carrier 33 is continuously rotating and driven by the winding servomotor 34 of the printing platform 30, the nano-scale ultrafine fibers formed from the droplets exported from the nozzle 22 will be scrolled and collected on the surface of the fiber carrier 33.

While the ultrafine fiber is being scrolled onto the fiber carrier 33, the control circuit 40 drives the driving servomotor 15 to rotate the driving screw 14, so that the sliding block 13, the nozzle seat 16, and the sprayer set 20 combined with the sliding block 13 horizontally and reciprocally move along the track 12. The droplets of the liquid plastic can be dynamically exported along the horizontal direction about the track 12 from the nozzle 22 of the sprayer set 20, so that the surface of the fiber carrier 33 can be fully covered by ultrafine fibers formed by stretching the droplets in the electric field for ultrafine fiber collection. In order to let the ultrafine fiber be formed more smoothly, the environment in the box 31 can be more optimized by controlling and adjusting the humidity and the temperature by a temperature humidity regulator. For instance, an air heater can be utilized to generate heated air for controlling the temperature and the humidity inside the box 31 in order to produce the fibers more smoothly.

The fiber carrier 33 of the printing platform 30 according to the first preferred embodiment of the present invention is a rotatable conductive cylinder. The fiber carrier 33 not only can be the rotatable conductive cylinder to scroll and collect the ultrafine fibers formed by in the electric field, but also can be a plate that is grounded. Additionally, the fiber carrier 33 can also be a human-shaped model. The nozzle 22 of the main printing unit 10 can be moved along so that the droplets exported from the nozzle 22 can be sprayed all over the surface of the fiber carrier 33. Again, the droplets will be stretched and form nano-scale ultrafine fibers in the electric field. As a result, using the fiber carrier 33, for instance, the human-shaped model or the plate as mentioned above, the ultrafine fibers fully covering a predetermined place on the surface of the fiber carrier 33 can form soft fabric membranes having specific shapes such as being plate-like or in any form of three-dimensional shapes. The printing platform 30 of the present invention can be not only a fixed platform as described previously according to the first preferred embodiment of the present invention, but also can be a moving platform by installing wheels onto the bottom of the box 31.

In addition, the electric field between the nozzle 22 and the fiber carrier 33 can be not only formed by supplying electrical voltage from the static electricity supply 60 to the nozzle 22 and grounding the fiber carrier 33, but also can be formed by the opposite, that is supplying electrical voltage to the fiber carrier 33 and grounding the nozzle 22. The form of the fiber carrier 33 and the movable dimension of the sprayer set 20 can vary upon different user settings, and are not limited to the aforementioned embodiments.

Figure 5:
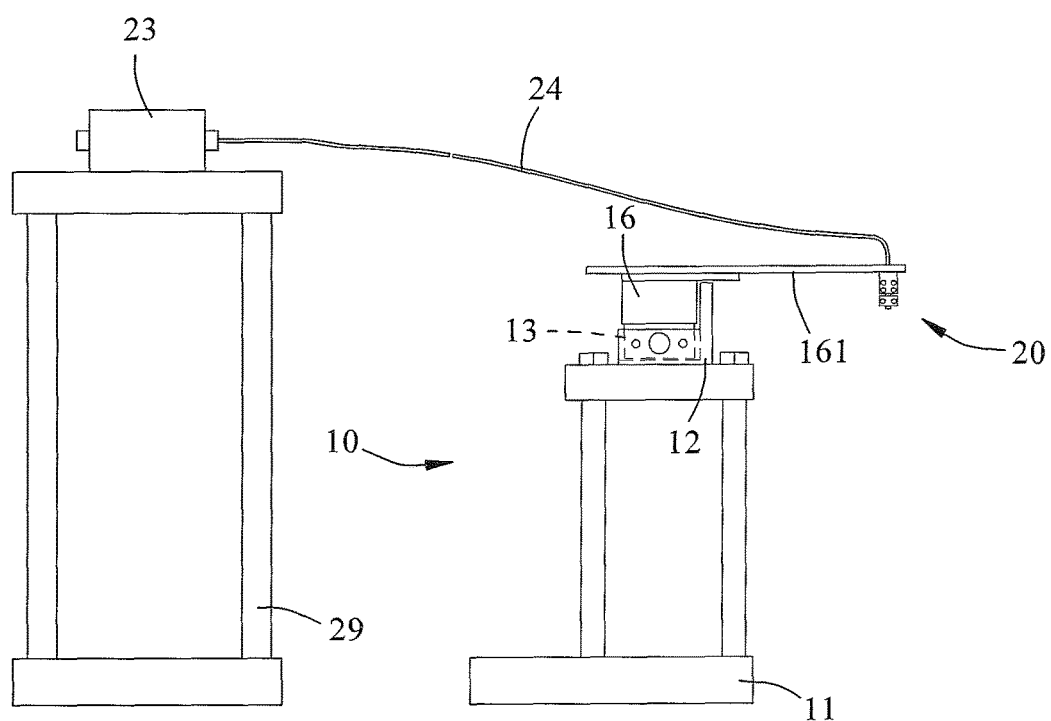
FIG. 5 is a front view of a main printing unit according to a second preferred embodiment of the present invention.
Figure 6:
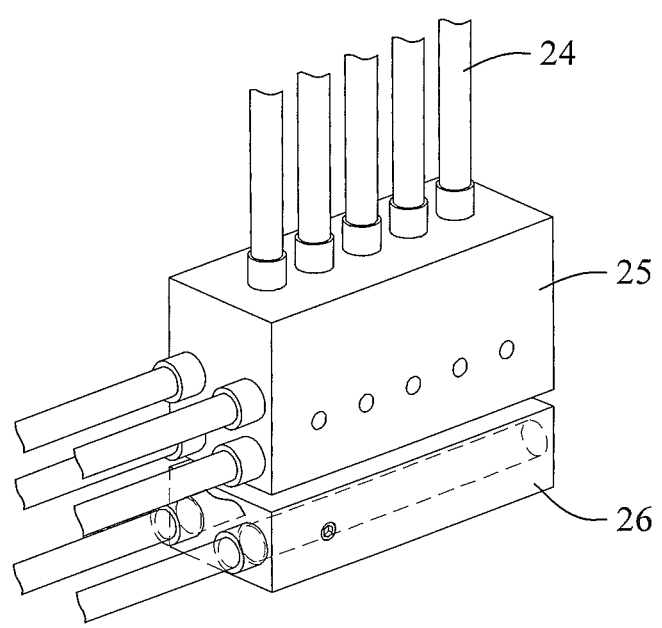
FIG. 6 is a perspective view of a sprayer set according to the second embodiment of the present invention.
Figure 7:
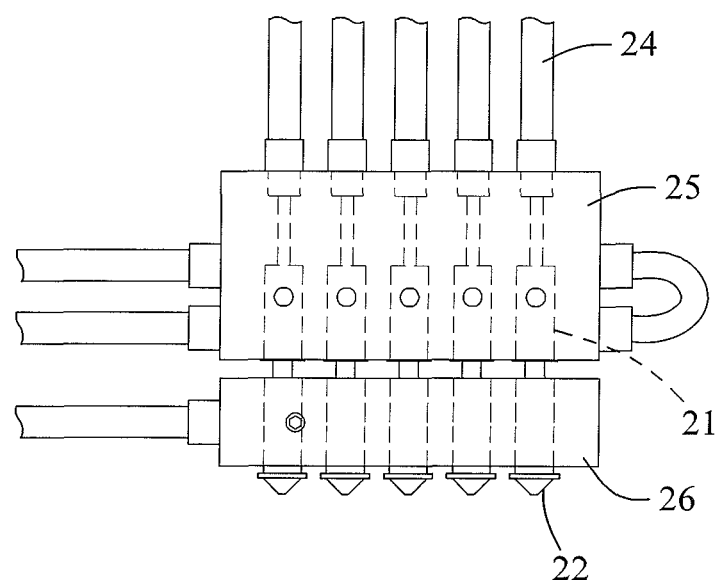
FIG. 7 is a right side view of the sprayer set according to the second embodiment of the present invention.

The sprayer set 20 of the main printing unit 10 of the present invention may have one single nozzle 22 as set forth in the first preferred embodiment. The sprayer set 20 may also include multiple nozzles 22 as shown in FIG. 5 to FIG. 7 illustrating a second preferred embodiment of the present invention. By having multiple nozzles 22, the production rate can be increased, thereby enhancing the overall production efficiency of the ultrafine fibers or fabric membranes.

According to the second preferred embodiment of the present invention, the main printing unit 10 includes a moving deck 11 in a state of being upright, where the top of the moving deck 11 is combined with a horizontally extended track 12. A horizontally slidable sliding block 13 is installed in the track 12, and the sliding block 13 is combined with a nozzle seat 16. A tabular extended portion 161 is extended from the nozzle seat 16 outwardly toward the front, and the bottom of the outer end of the extended portion 161 is combined with a sprayer set 20.

The sprayer set 20 has a plurality of pipes 21. For instance, the number of the pipes 21 can be five and arranged side by side according to a preferred embodiment. Each pipe 21 is in an upright orientation, and the bottom of each pipe 21 is connected with a nozzle 22. The rear side of the moving deck 11 has a stand 29. Corresponding with the number of the nozzle 22, several thread squeezers 23 having the same number as the nozzles 22 are disposed on the stand 29. A feed tube 24 is connected between each thread squeezer 23 and the top of each nozzle 22. The upper portion and the lower portion of the five pipes are sheathed in a heat dissipating unit 25 and a heater 26, respectively. The heat dissipating unit 25 is a water-cooled heat sink penetrated with a water-cooled pipeline, and the heater 26 is an electric heater. The sprayer set 20 is fixed to the bottom of the outer end of the extended portion 161 by combining with the heat dissipating unit 25.

The way to use and the probable changes of the structure of the ultrafine printer of the second preferred embodiment are exactly the same with the first preferred embodiment and is not repeated for the purpose of brevity. The aforementioned five thread squeezers 23 can not be only separated from the nozzle seat 16 and disposed on the stand 29, but also can be disposed directly on the nozzle seat 16. The main difference is that when the thread squeezers 23 are disposed on the stand 29, the weight supported by the nozzle seat 16 can be much lighter, and, thus, the weight loading of the sliding block 13 can be smaller, so that the sliding block 13 can be moved more easily.

Although the present disclosure has been described in considerable detail with reference to certain embodiments, other embodiments are possible. Therefore, the spirit and scope of the appended claims should not be limited to the description of the embodiments contained. It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims.

What is claimed is:

1. An ultrafine fiber printing system comprising:
   a main printing unit having a moving deck, with the moving deck having a nozzle seat driven to move, with the nozzle seat having a sprayer set including at least two pipes in an upright orientation and arranged side by side, at least two nozzles connected with ends of the at least two pipes, and at least two thread squeezers connected with opposite ends of the at least two pipes, with each pipe sheathed in a heat dissipating unit and a heater;
   wherein the at least two thread squeezers continuously deliver plastic filaments to the at least two pipes, wherein the heater melts the plastic filaments continuously delivered
   to the at least two pipes into liquid plastic as droplets are exported from the at least two nozzles;
   a printing platform disposed around the moving deck and having a fiber carrier;
   a static electricity supply providing electric voltage and connected to the at least two nozzles or the fiber carrier to provide voltage, wherein the at least two nozzles or the fiber carrier that is not connected to the static electricity supply is connected to a ground, wherein an electric field is formed between the at least two nozzles and the fiber carrier; and
   a stand deposited at a rear side of the moving deck, wherein a number of the at least two thread squeezers corresponds to a number of the at least two pipes, and wherein the at least two thread squeezers are combined on the stand, with each of the at least two of the thread squeezers connected to a corresponding at least two pipes through a feeding tube.

2. The ultrafine fiber printing system as claimed in claim 1, wherein the printing platform has:
   a box disposed in front of the main printing unit;
   a rotation shaft rotatably disposed inside the box, wherein the rotation shaft is horizontally oriented, and wherein the fiber carrier is an electrically conductive cylinder concentrically covering and surrounding the rotation shaft; and
   a winding motor disposed in the box, connected to the fiber carrier and the rotation shaft, and driving the rotation shaft.

3. The ultrafine fiber printing system as claimed in claim 1, wherein the printing platform has a temperature humidity regulator, and wherein the fiber carrier is disposed in a box.

4. The ultrafine fiber printing system as claimed in claim 1, wherein the nozzle seat has an extended portion extended outwardly toward a side of the printing platform, with the at least two pipes combined with an outer end of the extended portion, wherein the at least two nozzles are connected to bottom ends of the at least two pipes, with the at least two thread squeezers disposed on the nozzle seat, and wherein a feed tube is connected between the at least two thread squeezers and the top ends of the at least two pipes.

5. The ultrafine fiber printing system as claimed in claim 4, wherein the print platform has a box disposed in front of the main printing unit, with a rotation shaft rotatably disposed inside the box, wherein the rotation shaft is horizontally oriented, wherein the fiber carrier is a conductive cylinder concentrically covering and surrounding the rotation shaft, and wherein a winding motor is disposed in the box and connected to the rotation shaft thereby driving the rotation of the rotation shaft and the fiber carrier.

6. The ultrafine fiber printing system as claimed in claim 4, wherein the print platform has a box, and wherein a temperature humidity regulator and the fiber carrier are disposed in the box.

7. The ultrafine fiber printing system as claimed in claim 1, wherein the nozzle seat has an extended portion extended outwardly toward a side of the print platform, wherein the sprayer set is combined with an outer end of the extended portion, wherein the at least two pipes are in an upright orientation, and wherein the at least two nozzles are connected to bottom ends of the at least two pipes.

8. The ultrafine fiber printing system as claimed in claim 7, wherein the print platform has a box disposed in front of the main printing unit, wherein a rotation shaft is rotatably disposed inside the box, wherein the rotation shaft is horizontally oriented, wherein the fiber carrier is an electrically conductive cylinder concentrically covering and surrounding the rotation shaft, and wherein a winding servomotor is disposed in the box and connected to the rotation shaft thereby driving the rotation of the rotation shaft and the fiber carrier.

* * * * *